UNITED STATES PATENT OFFICE.

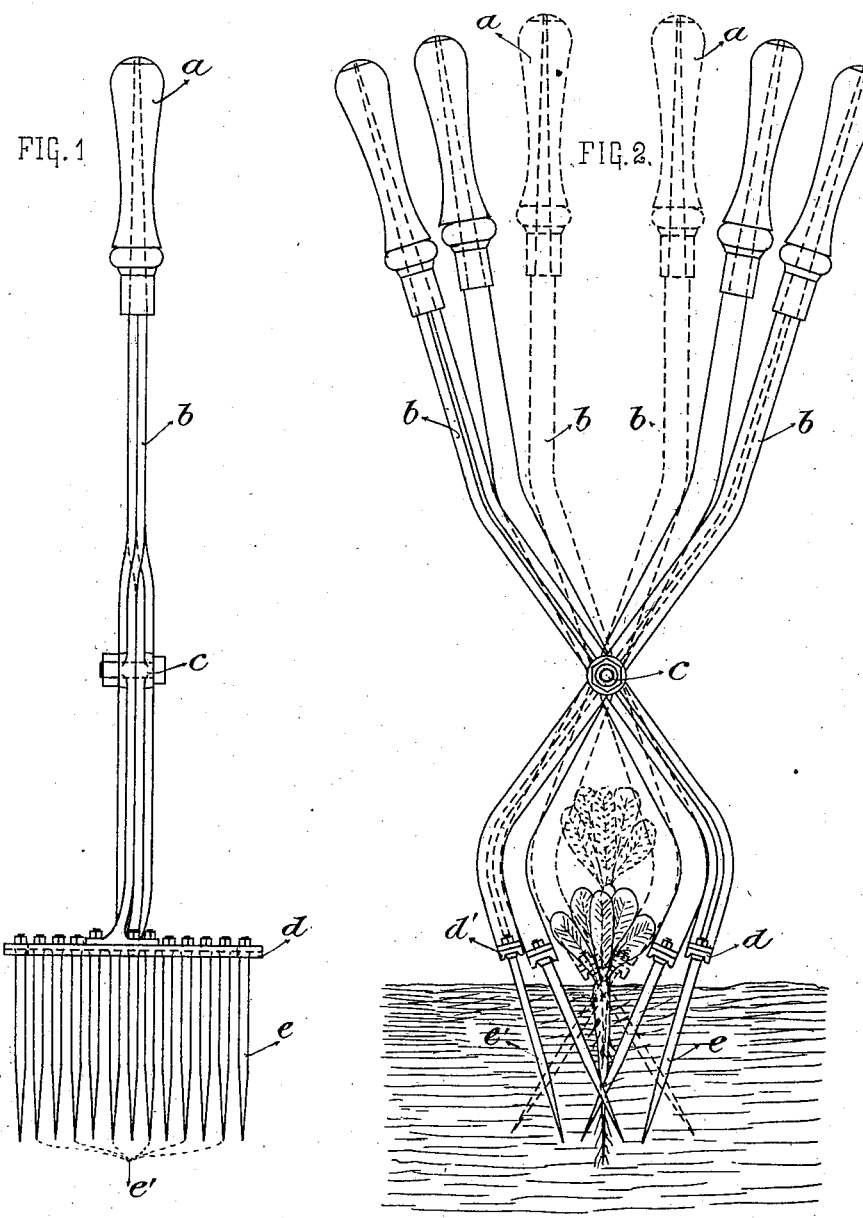

ERNST MAX GRUMMT, OF GELENAU, GERMANY.

AGRICULTURAL UTENSIL.

SPECIFICATION forming part of Letters Patent No. 700,192, dated May 20, 1902.

Application filed March 30, 1901. Serial No. 53,749. (No model.)

*To all whom it may concern:*

Be it known that I, ERNST MAX GRUMMT, a subject of the King of Saxony, and a resident of Gelenau, Saxony, Germany, have invented new and useful Improvements in Agricultural Utensils, of which the following is a specification.

The present invention relates to agricultural utensils, and more particularly to that class of implements employed for extracting weeds; and the invention consists of the details of construction hereinafter set forth, and particularly pointed out in the claim.

In order to render the present specification easily intelligible, reference is had to the accompanying drawings, in which similar letters of reference denote similar parts throughout both views.

Figure 1 is an end elevation of the implement, and Fig. 2 a side elevation showing the parts in their various positions.

The implement consists of the tongs $b\ b$, pivotally connected at $c$ and carrying at their lower extremities the cross-arms $d\ d'$, to which are screwed or riveted the two sets of prongs $e\ e'$. These prongs are alternately arranged, so that when the tongs are closed the said prongs will engage one set between the members of the opposite set. The parts of the arms $b\ b$ below the pivot $c$ are curved, so that the prongs $e\ e'$ will point inwardly toward each other, leaving a space above the transverse bars $d\ d'$ when the tongs are entirely closed, as indicated in dotted lines in Fig. 2.

The device operates in the following manner: The tongs are first opened, so that the sets of prongs stand a corresponding distance apart, and then the said sets of prongs are inserted into the soil at each side of the weed to be extracted. The handles $a\ a$ are then pressed together without, however, raising the implement from its position in the soil. The sets of prongs will consequently cross each other about the weed to be extracted and the point of their meeting will be gradually raised as the handles $a\ a$ are closed one against the other. This movement upward of the point of crossing of the prongs will extract the weed without breaking its roots, the distance between the prongs being sufficient to allow room for the root without breaking or cutting it off. The implement may then be taken out of the soil and the operation will, in addition to having extracted the weed, have loosened the soil at the point at which it was inserted.

Any number of prongs may be employed. In the present case one set is composed of six prongs and the opposite set of seven, which number suffices for ordinary purposes.

I claim as my invention—

An agricultural implement for extracting roots without damaging the same, consisting of a pair of arms, pivoted together shear-like and having the end below the pivot bent inwardly toward each other and a set of straight prongs mounted at each end and having the members of one set engaging between those of the other in the manner and for the purpose substantially as described.

In witness whereof I have hereunto set my hand in presence of two witnesses.

ERNST MAX GRUMMT.

Witnesses:
PAUL FABIAN,
FREDERICK J. DIETZMEN.